United States Patent Office 3,506,652
Patented Apr. 14, 1970

3,506,652
PROCESS FOR THE PRODUCTION OF STEROIDAL LACTONE COMPOUNDS AND INTERMEDIATES THEREOF
Paul L. Creger, Ann Arbor, Mich., assignor to Parke, Davis & Company, Detroit, Mich., a corporation of Michigan
No Drawing. Continuation-in-part of application Ser. No. 470,188, July 7, 1965. This application Feb. 5, 1968, Ser. No. 702,786
Int. Cl. C07c *173/00*
U.S. Cl. 260—239.57                    10 Claims

ABSTRACT OF THE DISCLOSURE

Process for the production of 3-steroidal-propionic acid lactones, in which the steroidal grouping is 3β,17β-dihydroxyandrost-5-en-17α-yl or 17β-hydroxy-3-oxo-androst-4-en-17α-yl, by first reacting 17β,20-epoxy - 17α - methylandrost-5-en-3β-ol or a 3-enamine derivative of 17β,20-epoxy-17α-methylandrost-4-en-3-one with an alkali metalloacetic acid derivative, such as N,N-dimethyl lithioacetamide, hydrolyzing the reaction mixture when necessary to remove the protective enamine grouping, and then either (a) further hydrolyzing directly the intermediate 3-steroidal-propionic acid derivative, or (b) first oxidizing the intermediate 3-(5-en-3β-hydroxy-steroidal)propionic acid derivative and then further hydrolyzing the 3-(4-en-3-oxo-steroidal)propionic acid derivative obtained. The products of the process are useful as intermediates in the synthesis of spironolactone.

CROSS REFERENCE TO RELATED APPLICATION

This application is a continuation-in-part of copending application Ser. No. 470,188, filed July 7, 1965, now abandoned.

SUMMARY AND DETAILED DESCRIPTION

The present invention relates to a process for the production of certain steroidal lactone compounds and to intermediates produced thereby. More particularly, the invention relates to a process for the production of steroidal lactone compounds having Formula I below, said process being represented overall by the following reaction:

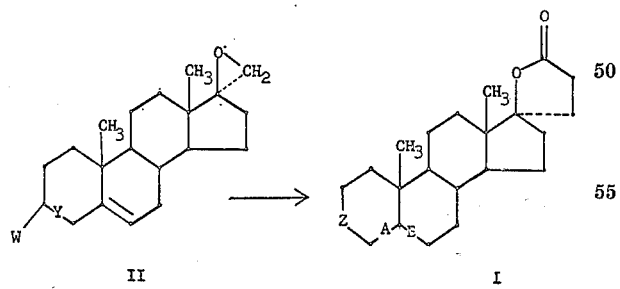

where Z represents a carbonyl (CO) or a β-hydroxymethylene (CHOH) group; A represents a double bond when Z is a carbonyl group and a single bond when Z is a β-hydroxymethylene group; B represents a single bond when Z is a carbonyl group and a double bond when Z is a β-hydroxymethylene group; W represents a β-hydroxyl group or an amino group, having the formula,

where each of $R_2$ and $R_3$ is lower alkyl or $R_2$ and $R_3$ are combined and together with the nitrogen atom to which they are attached represent a pyrrolidino, piperidino, or morpholino group; and Y represents a single bond when W is a hydroxy group and a double bond when W is an amino group. The preferred amino group represented by W in Formula II above is the pyrrolidino group, although the precise nature of the amino group is not critical, since, during the course of the process, the amino group is removed by hydrolysis.

In accordance with one feature of the invention a steroidal epoxide compound having Formula II above is reacted with a compound having the formula

$$M—CH_2—R_1$$

III and the reaction mixture is subsequently hydrolyzed to produce a steroid compound, having the formula,

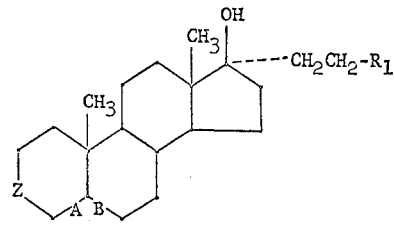

IV where M represents an alkali metal cation, preferably lithium; $R_1$ represents a group hydrolyzable to a carboxyl group, such as a carboxamido, substituted carboxamido, carboalkoxy, or cyano group; and Z, A, and B have the same meaning as previously given. The first stage of this reaction is normally carried out in an unreactive solvent medium at a temperature below about 150° C. Suitable solvents for use in this first stage include aliphatic and aromatic hydrocarbons, such as n-pentane, n-hexane, n-heptane, isooctane, benzene, toluene, and xylene; ethers, such as diethyl ether, dibutyl ether, dioxane, tetrahydrofuran, and diethylene glycol dimethyl ether; tertiary amines, such as triethylamine and tributylamine; and other unreactive solvents, such as hexamethylphosphoramidate; as well as mixtures of these. A preferred solvent medium is a mixture of n-heptane and tetrahydrofuran. Best results are obtained when the reaction is carried out at a temperature in the range of 50–75° C., although temperatures outside this range, from room temperature to about 150° C., may also be used. The duration of the first stage of this reaction is not critical and may be varied over a wide range, from about 10 minutes to 48 hours, with a period of from 10 to 20 hours being preferred. When W in the starting material of Formula II is a hydroxyl group, at least two equivalents of the compound of Formula III above are required. When W is an amino group, a single equivalent of III may be used. In both cases, however, best results are obtained when a moderate to large excess of the compound of Formula III is employed.

Upon completion of the first stage of this reaction, the reaction product mixture is hydrolyzed. The hydrolysis is accomplished by adding water along or a mixture of water and an organic acid, such as acetic acid, to the reaction mixture and heating. The purpose of this hydrolysis step is the decomposition of any excess compound of Formula III and the removal of the protective amino group from position 3.

The compound of Formula III used as a reactant in the first stage of the reaction described above is normally prepared and used in situ. The preferred compound, N,N-dimethyl-lithioacetamide, is conveniently prepared by first reacting diisopropylamine with n-butyl lithium in an unreactive solvent, such as n-heptane, and then reacting the lithium diisopropylamide product, without isolation, with N,N - dimethylacetamide. Other secondary amines and lithium alkyls may also be used in this preparation.

The steroidal epoxide compounds having Formula II that are used as starting materials in the foregoing reaction are prepared in a number of ways. The compound of Formula II wherein W represents a hydroxyl group is prepared by reacting a lower acyl ester of 3β-hydroxy-androst-5-en-17-one with dimethylsulfonium methylide of the formula $$(CH_3)_2S=CH_2$$

The compounds of Formula II wherein W represents an amino group as defined above can be prepared by first reacting 17β,20-epoxy-17α-methylandrost-5-en-3β-ol with a ketone in the presence of an aluminum alkoxide or an aluminum aryloxide and then reacting the 17β,20-epoxy-17α-methylandrost-4-en-3-one product with an amine having the formula

where $R_2$ and $R_3$ are as previously defined.

In accordance with another feature of the invention, a steroid compound having Formula IV above is hydrolyzed in an acidic or alkaline hydrolysis medium to produce a steroidal lactone compound having Formula I. Alkaline hydrolysis, which comprises the initial reaction of the steroid compound of Formula IV with an aqueous base and the subsequent acidification of the reaction mixture with a strong acid, such as a mineral acid, is the preferred method. The alkaline hydrolysis can best be effected by dissolving the steroid compound of Formula IV in a mixture of a water-miscible, non-reactive organic solvent and a large excess of a moderately concentrated (5–20%) aqueous solution of sodium or potassium hydroxide, heating the reaction mixture at the reflux temperature for several hours or until the hydrolysis is complete, and then acidifying the mixture with a mineral acid. While an organic solvent is not strictly required and the hydrolysis can be effected in an aqueous medium alone, best results are obtained when an organic solvent is used. Suitable water miscible, non-reactive solvents include lower alkanols, such as methanol, ethanol, and isopropanol; glycols, such as ethylene glycol and propylene glycol; and ethers, such as tetrahydrofuran, dioxane, diethylene glycol dimethyl ether, and 1,2-dimethoxyethane; as well as mixtures of these. Ethanol and tetrahydrofuran are preferred organic solvents. While best results are obtained by heating the reaction mixture at the reflux temperature for several hours, the temperature and duration of the reaction are not critical and may be varied over a wide range, from 12 hours or more at 25° C. to 30–90 minutes at 110° C.

Acidic hydrolysis is accomplished by heating a mixture consisting of the steroid compound of Formula II, an unreactive organic solvent, which is preferably a lower alkanol, and a moderate excess of a strong acid, such as hydrochloric or sulfuric acid, for from 2 to 10 hours or until hydrolysis is complete. When acidic hydrolysis reaction conditions are employed, the steroidal lactone product is isolated directly from the reaction mixture.

In accordance with a third feature of the invention, a 5-en-3β-hydroxy steroid compound having the formula,

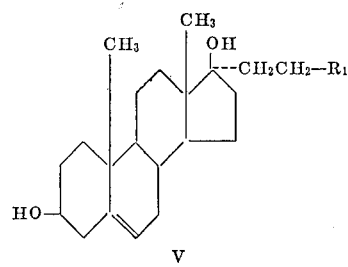

is oxidized by reaction with a ketone in the presence of an aluminum alkoxide or an aluminum aryloxide to produce a 4-en-3-oxo steroid compound having the formula,

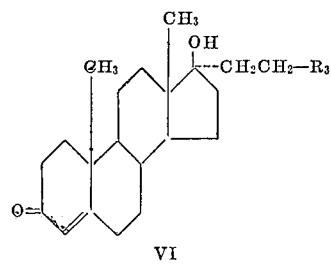

which is then hydrolyzed according to the procedure described above to produce 3-(17β-hydroxy-3-oxoandrost-4-en-17α-yl)propionic acid lactone, having the formula,

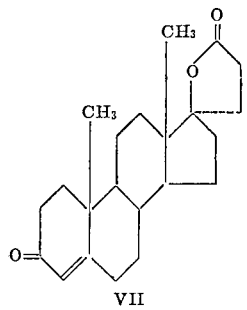

where $R_1$ has the same meaning as previously given. In the oxidation reaction the ketone serves as a hydrogen acceptor, and can be an aliphatic ketone, such as acetone, diethyl ketone, methyl ethyl ketone, or diisopropyl ketone; or a cycloaliphatic ketone, such as cyclopentanone or cyclohexanone. A preferred ketone for use in the reaction is cyclohexanone. Some examples of suitable aluminum alkoxides are aluminum isopropoxide and aluminum t-butoxide. A suitable aluminum aryloxide is aluminum phenoxide. The reaction can be carried out in any of a variety of unreactive solvents, typically aromatic hydrocarbons, such as benzene, toluene, or xylene. The ketone employed as hydrogen acceptor is normally used in considerable excess, the preferred quantity being from 10 to 25 times the theoretical amount. The amount of aluminum alkoxide or aluminum aryloxide can be varied over a considerable range. Most commonly about 0.5 mole of this compound is used for each mole of steroid compound. The relative quantity of the aluminum alkoxide or aluminum aryloxide, however, can be varied from between about 0.25 to 2.0 moles without disadvantageous effect on the reaction. The time and temperature may be varied over a wide range, depending somewhat on the choice of solvent, on the particular ketone used as hydrogen acceptor, and on the ratios of the reactants. With refluxing toluene as the solvent and cyclohexanone as the hydrogen acceptor, the oxidation reaction is normally complete within from 30 minutes to 4 hours. Isolation of the reaction product is facilitated by washing the reaction mixture with an aqueous sodium potassium tartrate to remove aluminum compounds, and by distillation of the volatile components. In some cases it is possible and may be preferable to react the oxidation reaction product further without isolation.

The products produced by the process of the invention are useful chemical intermediates. The use of the steroid compound having Formula IV as chemical intermediates is evident from the foregoing description. The steroidal lactone compounds having Formula I are of value as intermediates in the synthesis of the known antialdosterone diuretic agent, spironolactone, 3-(3-oxo - 7α - acetylthio-17β-hydroxyandrost-4-en-17α - yl)propionic acid lactone. The preparation of this agent, employing the present steroidal lactone compounds as intermediates, and its pharmacological activity have been described in the Journal of Organic Chemistry, vol. 24, pages 743–748 and pages 1109–1110, 1959.

The invention is illustrated by the following examples.

Example 1

A solution of 3.9 g. of 3-(3β,17β-dihydroxyandrost-5-en-17α-yl)propionic acid dimethylamide in 100 ml. of ethanol and 80 ml. of 5% aqueous sodium hydroxide is heated under reflux for 5 hours. The ethanol is then evaporated under reduced pressure, and the aqueous solution is diluted with 200 ml. of water and acidified with 35 ml. of 3 N hydrochloric acid. The somewhat impure 3-(3β,17β-dihydroxyandrost-5-en-17α - yl)propionic acid lactone that precipitates is isolated, washed with water, and suspended in 100 ml. of warm methanol. The methanolic suspension is treated with 0.5 ml. of 3 N hydrochloric acid, the resulting solution is evaporated under reduced pressure, and the residue is extracted with 150 ml. of chloroform. The chloroform extract is washed with 25 ml. of 10% aqueous sodium carbonate and with water, is dried and evaporated to give the purified steroidal lactone product; M.P. 190–192° C., following successive crystallizations from aqueous ethanol and from ethyl acetate.

The 3-(3β,17β-dihydroxyandrost-5-en-17α-yl)propionic acid dimethylamide used in the foregoing procedure is prepared as follows.

A mixture of 10.8 g. sodium hydride and 250 ml. dimethyl sulfoxide is heated with stirring at 65–70° C. until evolution of hydrogen ceases. The solution is diluted with 600 ml. tetrahydrofuran, cooled to −10° C., and 92 g. of trimethylsulfonium iodide is added. The resulting mixture containing dimethylsulfonium methylide is stirred for 5 minutes at −10° C. and then 49.5 g. 3β-acetoxyandrost-5-en-17-one is added. The mixture is stirred for 2½ hours at −10° C. and for an additional 15 minutes at 25° C. It is then chilled and diluted with 600 ml. water, with external cooling to maintain the temperature below 20° C. The diluted mixture is stirred for 10 minutes and the organic phase is separated and combined with chloroform extracts of the aqueous phase. The organic phase is washed with water, dried, and evaporated to give a residue of 17β,20-epoxy-17α-methylandrost-5-en-3β-ol; M.P. 172–176° C. following crystallization from acetonitrile.

To a solution of 5.6 g. of diisopropylamine in 200 ml. of tetrahydrofuran is added 25 ml. of 2.0 M n-butyl lithium in n-heptane. The resulting solution is stirred for 5 minutes, and a solution of 4.4 g. of N,N-dimethylacetamide in 15 ml. of anhydrous tetrahydrofuran is added. After 5 more minutes of stirring, a solution of 3.0 g. of 17β,20-epoxy-17α-methylandrost-5-en-3β-ol in 50 ml. of tetrahydrofuran is added, and the resulting mixture is stirred and heated under reflux for 18 hours. Upon cooling, the solution is neutralized with a solution of 3.0 g. of glacial acetic acid in 50 ml. of water, and the organic phase is separated, washed with cold dilute hydrochloric acid, with water, is dried, and evaporated under reduced pressure. The solid 3-(3β,17β-dihydroxyandrost-5-en-17α - yl)propionic acid dimethylamide thus obtained is triturated with ether, isolated, and dried; M.P. 217–220° C., following crystallization from aqueous acetonitrile.

Example 2

A solution of 2.13 g. of 3-(17β-hydroxy-3-oxoandrost-4-en-17α-yl)propionic acid dimethylamide in 100 ml. of tetrahydrofuran and 40 ml. of 10% aqueous sodium hydroxide is heated under reflux for 2 hours. The tetrahydrofuran is evaporated, and the aqueous solution is diluted with 80 ml. of water, washed with chloroform, treated with charcoal and filtered. The aqueous filtrate is diluted with 75 ml. of methanol, acidified with 2 N hydrochloric acid, and the acidic mixture is extracted with chloroform. The chloroform extract is washed with water, dried, and evaporated to give 3-(17β-hydroxy-3-oxoandrost - 4 - en - 17α-yl)propionic acid lactone; M.P. 148.5–149° C., following successive crystallizations from isopropyl ether and ethyl acetate.

The 3 - (17β-hydroxy-3-oxoandrost-4-en-17α-yl)propionic acid dimethylamide used in the foregoing procedure is prepared as follows:

A stirred mixture of 6.0 g. of 17β,20-epoxy-17α-methylandrost-5-en-3β-ol, 350 ml. toluene, and 39 g. cyclohexanone is distilled until about 50 ml. is collected as a distillate. The mixture is cooled slightly and 2.0 g. aluminum isopropoxide is added. With efficient stirring, the mixture is heated at reflux for one hour, cooled, washed with a saturated aqueous solution of sodium potassium tartrate, and distilled with steam until 2 liters of distillate is collected. The remaining mixture is chilled and the insoluble product collected on a filter, washed with water, and dried. It is 17β,20-epoxy-17α-methylandrost-4-en-3-one. For purification, this product is dissolved in 1:1 isopropyl ether-hexane and the solution passed over a chromatography column prepared with alumina. The product is eluted with additional portions of 1:1 isopropyl ether-hexane and recovered by evaporation of the solvent. Following crystallizations from aqueous propanol and from isopropyl ether, it has M.P. 175–178° C. To a hot solution of 3.0 g. of 17β,20-epoxy-17α-methylandrost-4-en-3-one in 50 ml. of methanol is added with stirring 3.5 g. of pyrrolidine. The mixture is kept at room temperature for several minutes, then cooled in ice and the 17β,20-epoxy-17α-methyl-3-pyrrolidinoandrosta-3,5-diene that crystallizes is isolated, washed with cold methanol, and dried; M.P. 171–177° C., suitable for use without further purification.

To a solution of 5.6 g. of diisopropylamine in 200 ml. of tetrahydrofuran is added 25 ml. of 2.0 M n-butyl lithium in n-heptane. The resulting solution is stirred for 5 minutes, and a solution 4.4 g. of N,N-dimethylacetamide in 5 ml. of tetrahydrofuran is added. After 5 more minutes of stirring, 2.70 g. of 17β,20-epoxy-17α-methyl-3-pyrrolidinoandrosta-3,5-diene is added, and the resulting mixture is stirred and heated under reflux for 18 hours. Upon cooling, the mixture is treated with 12.0 g. of glacial acetic acid and 30 ml. of water, stirred for 3 hours, and then extracted with ether. The ether extract is washed with water, dried, and evaporated to give 3 - (17β-hydroxy-3-oxoandrost-4-en-17α-yl)propionic acid dimethylamide; M.P. 216–218° C., following two crystallizations from aqueous ethanol.

Example 3

A solution of 2.15 g. of 3-(3β,17β-dihydroxyandrost-5-en-17α-yl)propionic acid dimethylamide and 10.8 g. of cyclohexanone in 250 ml. of toluene is distilled until about 50 ml. of toluene is collected. The solution is cooled slightly, 1.1 g. of aluminum isopropoxide is added, and the mixture is heated under reflux for one hour. Upon cooling, the mixture is treated with 50 ml. of saturated aqueous potassium sodium tartrate, stirred for about 10 minutes, and then steam-distilled until about 1000 ml. of distillate is collected. The aqueous residue is extracted with chloroform, and the extract is washed with water, dried, and evaporated. The solid residue, which is somewhat impure 3-(17β-hydroxy-3-oxoandrostat-4-en-17α-yl)propionic acid dimethylamide, is dissolved in 100 ml. of tetrahydrofuran, 40 ml. of 10% aqueous sodium hydroxide is added and the resulting solution is heated under reflux for 2 hours. After evaporation of the tetrahydrofuran, the aqueous residue is diluted with 80 ml. of water, washed with chloroform, treated with charcoal, and filtered. The filtrate is diluted with 75 ml. of methanol, acidified with 2 N hydrochloric acid, and the acidic mixture is extracted with chloroform. The chloroform extract is washed with water, dried and evaporated to give 3-(17β-hydroxy-3-oxoandrost-4-en-17α-yl)propionic acid lactone; M.P. 148.5–149° C., following successive crystallizations from isopropyl ether and aqueous ethanol.

Example 4

A mixture consisting of 1.93 g. of 3-(17β-hydroxy-3-oxoandrost-4-en-17α-yl)propionic acid dimethylamide, 100 ml. of ethanol, and 15 ml. of 3 N hydrochloric acid is heated under reflux for 3 hours. The solvent is evaporated to near-dryness, and the residue is extracted with ether. The ethereal extract is washed with water, dried, and evaporated to give 3-(17β-hydroxy-3-oxoandrost-4-en-17α-yl)propionic acid lactone; M.P. 148–149° C., following successive crystallizations from aqueous ethanol and ethyl acetate.

Example 5

A mixture consisting of 3.4 g. of 3-(3β,17β-dihydroxyandrost-5-en-17α-yl)propionitrile, 100 ml. of ethanol, and 80 ml. of 5% aqueous sodium hydroxide is heated under reflux overnight. Upon cooling, the resulting solution is acidified with 40 ml. of 3 N hydrochloric acid, and the ethanol is evaporated under reduced pressure. The residue is extracted with 200 ml. of a 1:1 mixture of chloroform and ether, and the extract is washed with 50 ml. of 10% aqueous sodium carbonate, with water, then dried and evaporated. The solid 3-(3β,17β-dihydroxyandrost-5-en-17α-yl)propionic acid lactone thus obtained is purified by successive crystallizations from aqueous ethanol and from ethyl acetate; M.P. 190–191° C.

The 3-(3β,17-dihydroxyandrost-5-en-17α-yl)propionitrile used in the foregoing procedure can be prepared according to the following procedure. To a solution of 5.6 g. of diisopropylamine in 200 ml. of tetrahydrofuran is added 25 ml. of 2.0 M n-butyl lithium in n-heptane. The resulting solution is stirred for 5 minutes, and a solution of 2.05 g. of acetonitrile in 15 ml. of anhydrous tetrahydrofuran is added. After 5 more minutes of stirring, a solution of 17β,20-epoxy-17α-methylandrost-5-en-3β-ol in 50 ml. of tetrahydrofuran is added, and the resulting mixture is stirred and heated under reflux for 18 hours. Upon cooling, the solution is neutralized with a solution of 3.0 g. of glacial acetic acid in 50 ml. of water, and the organic phase is separated, washed with cold dilute hydrochloric acid, with water, is dried, and evaporated under reduced pressure. The solid 3-(3β,17β-dihydroxyandrost-5-en-17α-yl)propionitrile thus obtained is triturated with ether, isolated and dried; it is suitable for use without further purification.

I claim:
1. Process for the production of a steroid compound having the formula

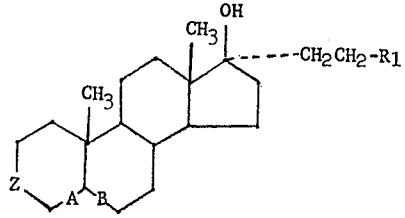

which comprises reacting a steroidal epoxide compound having the formula

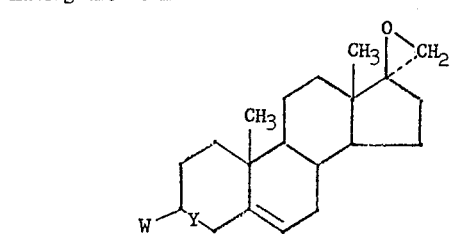

with a compound having the formula

and subsequently hydrolyzing the reaction mixture; where M represents an alkali metal cation; $R_1$ represents a group selected from the class consisting of substituted carboxamido and cyano; Z is selected from the class consisting of a carbonyl group and a β-hydroxymethylene group; A and B are each selected from the class consisting of a double bond and a single bond; and Z, A, and B are selected to constitute one of the following combinations:

Z=carbonyl
A=double bond
B=single bond

Z=β-hydroxymethylene
A=single bond
B=double bond

W is selected from the class consisting of a β-hydroxyl group and an amino group having the formula

where $R_2$ and $R_3$ are chosen from the class consisting of lower alkyl and further members wherein $R_2$ and $R_3$ are combined and together with the nitrogen atom to which they are attached represent a member of the class consisting of pyrrolidino, piperidino, and morpholino groups; Y is selected from the class consisting of a double bond and a single bond; and W and Y are selected to constitute one of the following combinations;

W=β-hydroxyl
Y=single bond

W=amino
Y=double bond

2. Process according to claim 1 wherein M is a lithium cation.

3. Process according to claim 1 wherein M is a lithium cation and $R_1$ represents an N,N-dimethylcarboxamido group.

4. Process according to claim 1 wherein 17β,20-epoxy-17α-methylandrost-5-en-3β-ol is reacted with N,N-dimethyl lithioacetamide in an unreactive solvent medium and the reaction mixture is subsequently hydrolyzed to produce 3-(3β,17β-dihydroxyandrost-5-en-17α-yl)propionic acid dimethylamide.

5. Process according to claim 1 wherein 17β,20-epoxy-17α-methyl-3-pyrrolidinoandrosta-3,5-diene is reacted with N,N-dimethyl lithioacetamide in an unreactive solvent medium and the reaction mixture is subsequently hydrolyzed to produce 3-(17β-hydroxy-3-oxoandrost-4-en-17α-yl)propionic acid dimethylamide.

6. Process according to claim 1 wherein the steroid product, having the formula

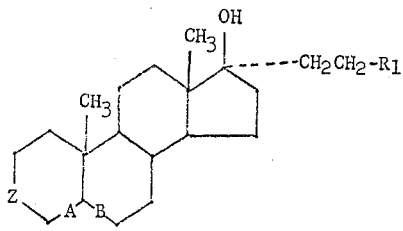

is further hydrolyzed to produce a steroidal lactone compound, having the formula

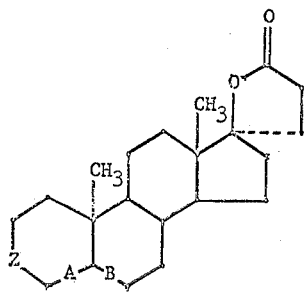

where $R_1$, Z, A, and B are each defined as in claim 1.

7. Process according to claim 6 wherein the hydrolysis is an alkaline hydrolysis.

8. Process according to claim 6 wherein $R_1$ represents an N,N-dimethylcarboxamide group.

9. 3 - (3β,17β-dihydroxyandrost-5-en-17α-yl)propionic acid dimethylamide.

10. 3-(17β-hydroxy-3-oxoandrost-4-en-17α-yl)propionic acid dimethylamide.

References Cited

UNITED STATES PATENTS

| | | | |
|---|---|---|---|
| 2,705,712 | 4/1955 | Cella | 260—239.57 |
| 3,300,489 | 1/1967 | Holden | 260—239.57 |
| 3,413,288 | 11/1968 | Creger | 260—239.57 |

OTHER REFERENCES

Heusler, K., Helv. Chim. Acta, vol. XLV, Fasc. VI, 1962, pp. 1939–1942.

LEWIS GOTTS, Primary Examiner

E. G. LOVE, Assistant Examiner

U.S. Cl. X.R.

260—397.1, 397.4, 397.5, 239.55